United States Patent
Ochi et al.

(10) Patent No.: US 10,627,659 B2
(45) Date of Patent: Apr. 21, 2020

(54) ADHESIVE SHEET COMPRISING AN INNER OPENING USED FOR DISPLAY DEVICE AND METHOD OF MANUFACTURING DISPLAY DEVICE

(71) Applicant: Japan Display Inc., Tokyo (JP)

(72) Inventors: Tetsuro Ochi, Tokyo (JP); Hiroyuki Sakakura, Tokyo (JP)

(73) Assignee: Japan Display Inc., Tokyo (JP)

( * ) Notice: Subject to any disclaimer, the term of this patent is extended or adjusted under 35 U.S.C. 154(b) by 210 days.

(21) Appl. No.: 15/383,615

(22) Filed: Dec. 19, 2016

(65) Prior Publication Data

US 2017/0184911 A1  Jun. 29, 2017

(30) Foreign Application Priority Data

Dec. 28, 2015  (JP) ................. 2015-256480

(51) Int. Cl.
  *G02F 1/1333* (2006.01)
  *H04M 1/02* (2006.01)
(52) U.S. Cl.
  CPC .... *G02F 1/133308* (2013.01); *H04M 1/0266* (2013.01); *G02F 2001/133317* (2013.01); *G02F 2001/133325* (2013.01); *G02F 2001/133328* (2013.01); *G02F 2001/133331* (2013.01); *G02F 2202/28* (2013.01)
(58) Field of Classification Search
  CPC ........ G02F 2001/133317; G02F 2001/133328; G02F 2001/133325; H04M 1/0266
  See application file for complete search history.

(56) References Cited

U.S. PATENT DOCUMENTS

| | | | |
|---|---|---|---|
| 2009/0021679 A1* | 1/2009 | Cheng | G02F 1/133308 349/122 |
| 2011/0285934 A1 | 11/2011 | Watanabe | |
| 2013/0040093 A1* | 2/2013 | Horiuchi | C09J 7/40 428/78 |
| 2016/0016396 A1* | 1/2016 | Kikuchi | G02F 1/1309 156/64 |
| 2016/0116788 A1 | 4/2016 | Samurada et al. | |

FOREIGN PATENT DOCUMENTS

| | | | | |
|---|---|---|---|---|
| JP | 2002283772 A | * | 10/2002 | |
| JP | 2008103700 A | * | 5/2008 | ............ H01L 24/27 |
| JP | 2010-026216 A | | 2/2010 | |
| JP | 5122657 B2 | | 1/2013 | |
| JP | WO 2014148195 A1 | * | 9/2014 | .......... G02F 1/1309 |
| JP | 2015227389 A | * | 12/2015 | |
| JP | 2016-085416 A | | 5/2016 | |

* cited by examiner

*Primary Examiner* — Paul C Lee

(74) *Attorney, Agent, or Firm* — K&L Gates LLP

(57) ABSTRACT

According to one embodiment, a display device includes a liquid crystal display panel, a cover panel on a display surface of the liquid crystal display panel, a backlight unit opposed to the liquid crystal display panel, a case covering the backlight unit and the liquid crystal display panel, and including at least a part fixed to the cover panel, and an adhesive provided on the cover panel along the liquid crystal display panel. The adhesive includes a surface opposite to the cover panel, a first area on the surface, and a second area on the surface, located on an inner side closer to the liquid crystal display panel than the first area. The part of the case is adhered to the second area.

6 Claims, 17 Drawing Sheets

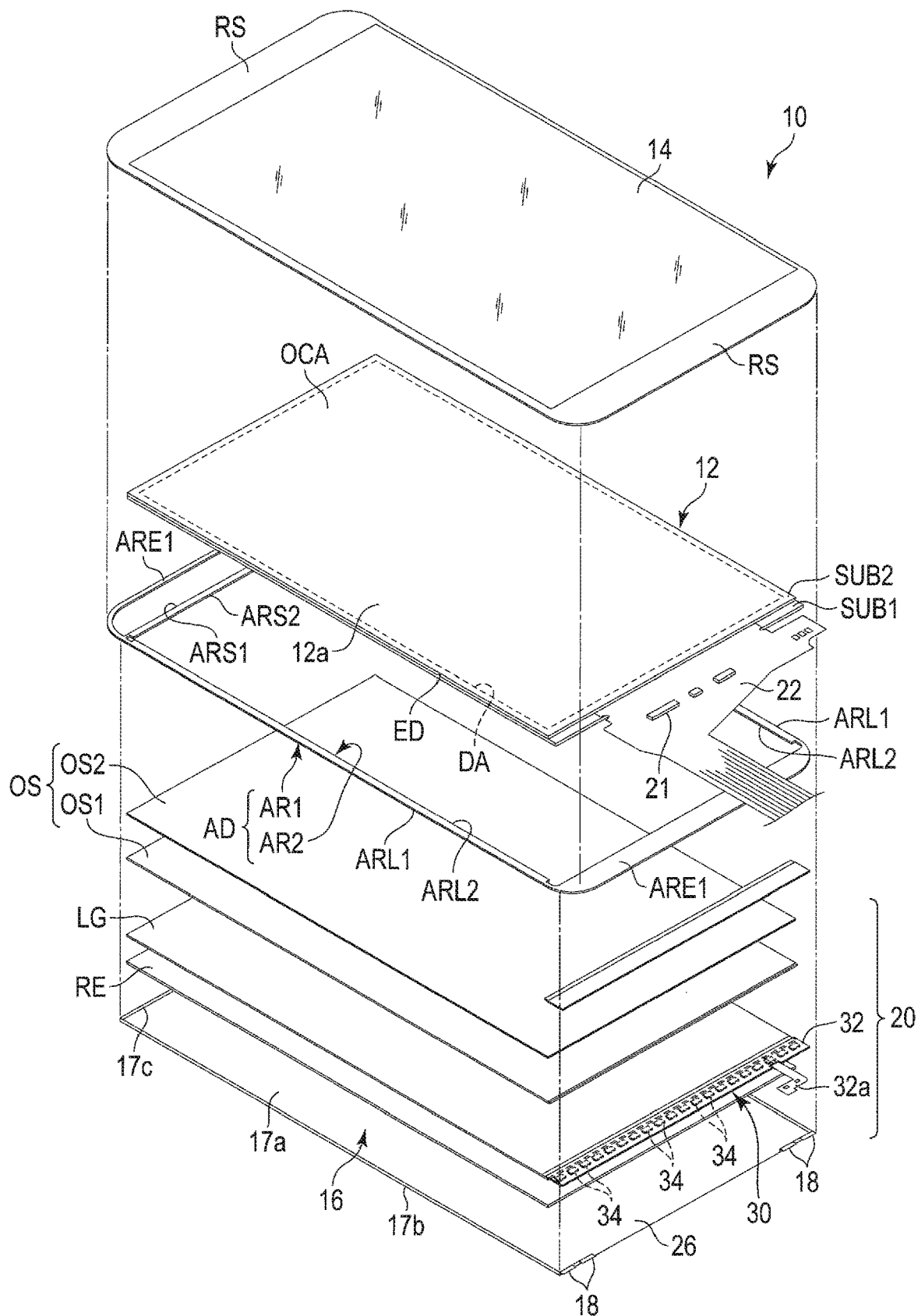
F I G. 3

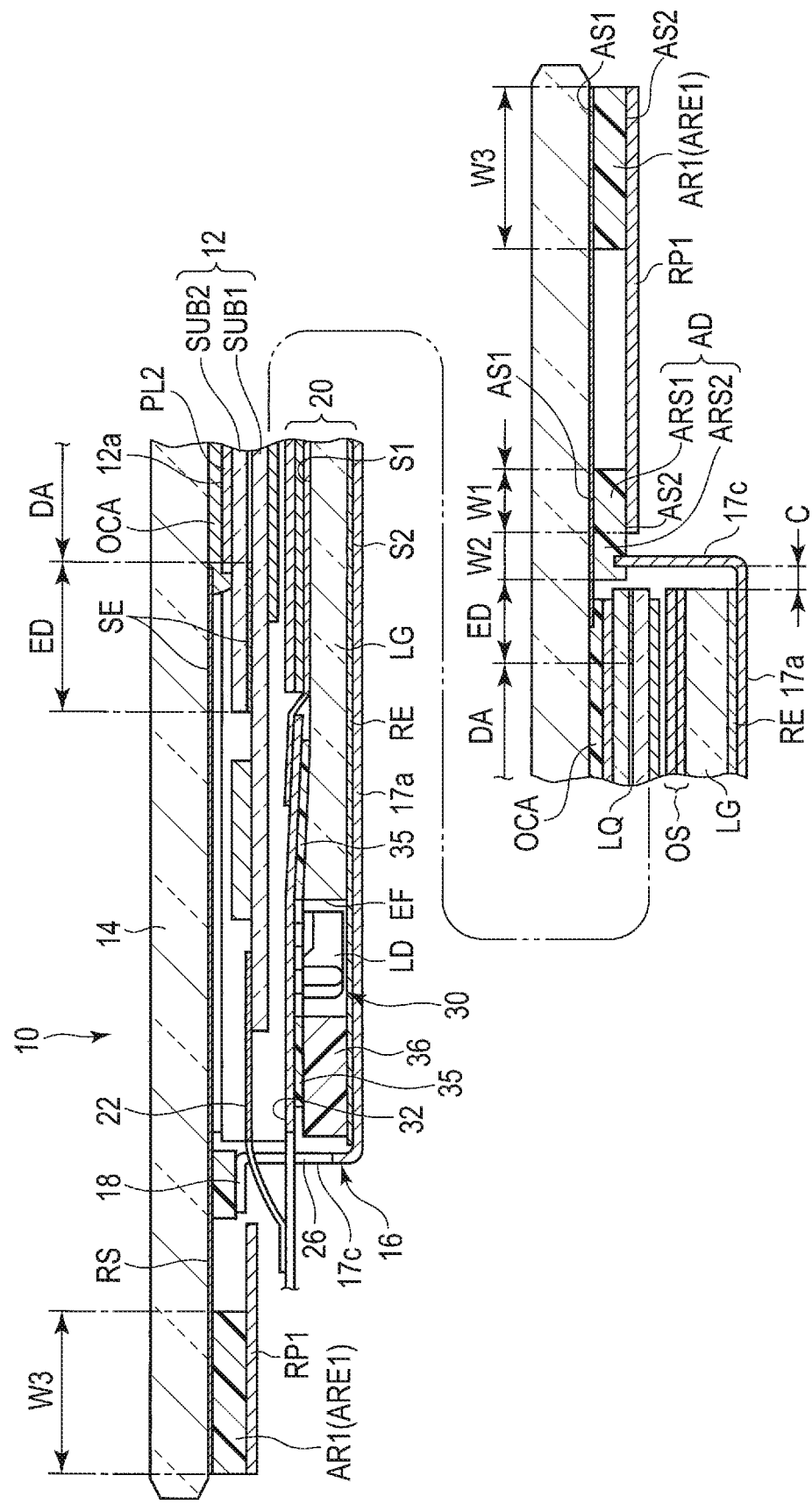
F I G. 6

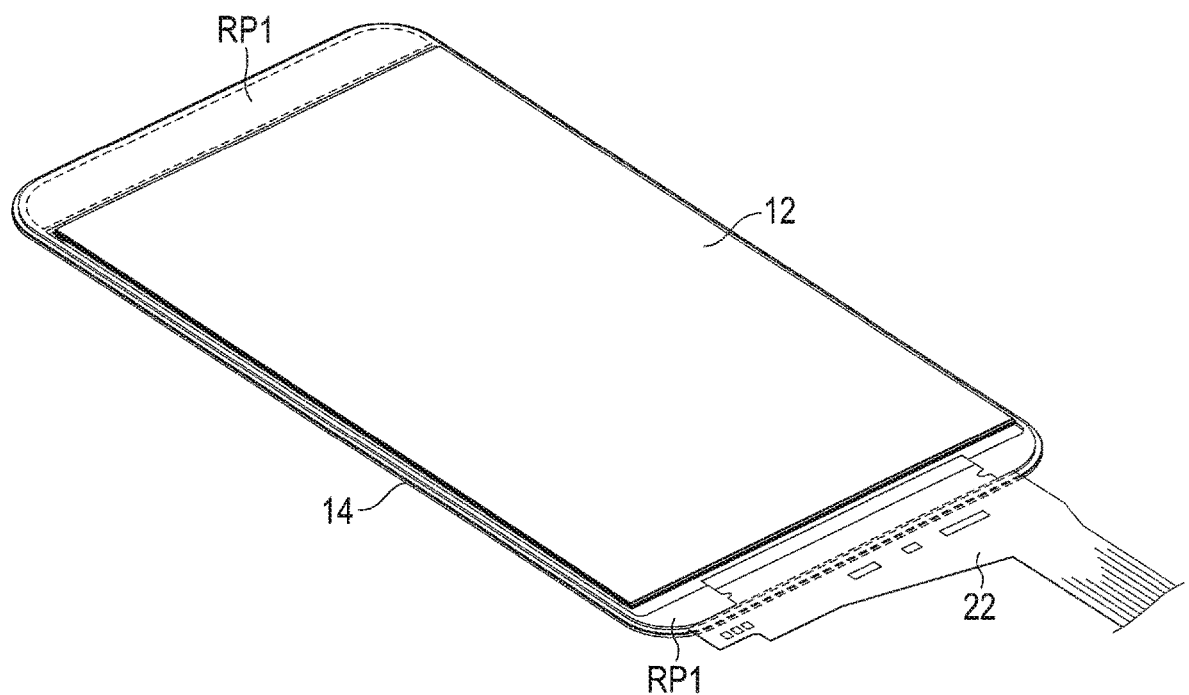
F I G. 14
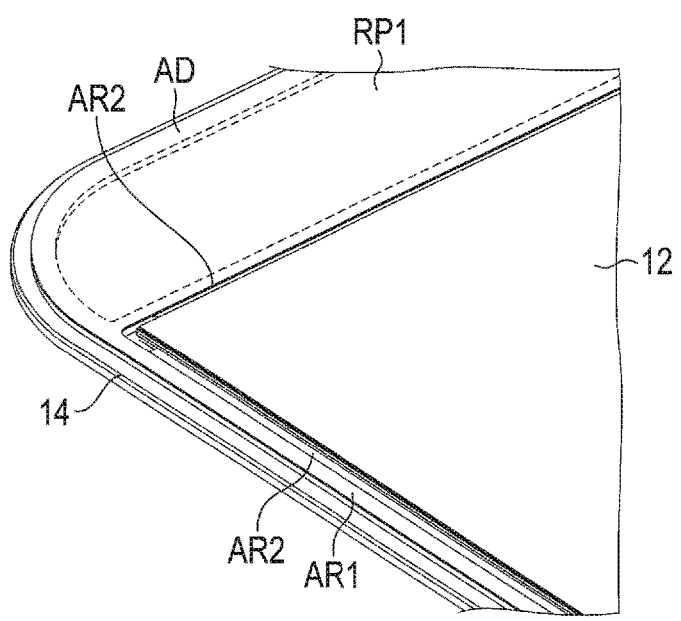
F I G. 15

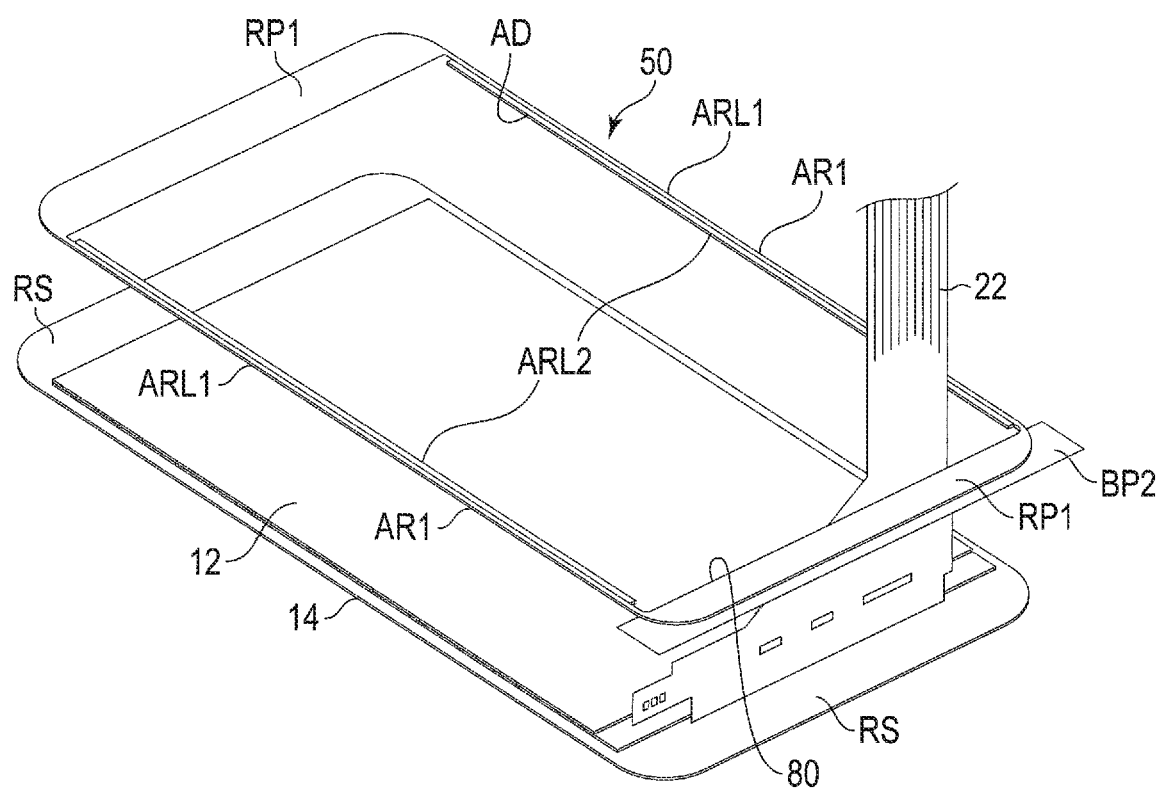
F I G. 24

ADHESIVE SHEET COMPRISING AN INNER OPENING USED FOR DISPLAY DEVICE AND METHOD OF MANUFACTURING DISPLAY DEVICE

CROSS-REFERENCE TO RELATED APPLICATIONS

This application is based upon and claims the benefit of priority from Japanese Patent Application No. 2015-256480, filed Dec. 28, 2015, the entire contents of which are incorporated herein by reference.

FIELD

Embodiments described herein relate generally to a display device, an adhesive sheet used for a display device, and a method of manufacturing a display device.

BACKGROUND

Recently, liquid crystal display devices have been widely used as display devices of smartphones, personal assistant devices (PAD), tablet computers, car navigation systems and the like. In general, a liquid crystal display device comprises a liquid crystal display panel, and a flat lighting device (backlight device) overlaid on a back surface of the liquid crystal display panel to illuminate the liquid crystal display panel. A conventional backlight device comprises a reflective layer, a light guide, an optical sheet, LEDs serving as light sources, and a rectangular mold frame. The reflective layer, the light guide, and the optical sheet are mutually stacked and disposed in the mold frame. Peripheral portions of the reflective layer, the light guide, and the optical sheet are thereby supported and positioned by the mold frame.

Alternatively, there has been proposed a configuration wherein the mold frame is fitted in a case (backlight cover) formed of a metal plate and the reflective layer, the light guide, and the optical sheet are disposed in a cavity portion of the mold frame.

In recent years, as display areas have increased, there has been a continual demand for the frames of liquid crystal display devices to become ever narrower and the liquid crystal display devices to become ever thinner. However, the dimensions of the width, thickness, etc., of the mold frame in the above-described backlight unit is approaching the structural limit of injection molding.

SUMMARY

The present application relates generally to a display device, an adhesive sheet used for a display device, and a method of manufacturing a display device.

In an embodiment, a display device is provided. The display device includes a liquid crystal display panel, a cover panel on a display surface of the liquid crystal display panel, a backlight unit opposed to the liquid crystal display panel, a case covering the backlight unit and the liquid crystal display panel, and including at least a part fixed to the cover panel, and an adhesive provided on the cover panel along the liquid crystal display panel. The adhesive includes a surface opposite to the cover panel, a first area on the surface, and a second area on the surface, located on an inner side closer to the liquid crystal display panel than the first area. The part of the case is adhered to the second area.

Additional features and advantages are described herein, and will be apparent from the following Detailed Description and the figures.

BRIEF DESCRIPTION OF THE DRAWINGS

FIG. 3 is an exploded perspective view showing the liquid crystal display device.

FIG. 6 is a cross-sectional view showing the liquid crystal display device as seen along line B-B in FIG. 1.

FIG. 14 is a perspective view showing a state of bonding the adhesive sheet on the cover panel, in the manufacturing process.

FIG. 15 is a partially enlarged perspective view showing a back surface side of the liquid crystal display device.

FIG. 24 is an exploded perspective view showing a process of applying the adhesive sheet to the cover panel to which the liquid crystal display panel has been applied.

DETAILED DESCRIPTION

Various embodiments will be described hereinafter with reference to the accompanying drawings. In general, according to one embodiment, a display device comprises a liquid crystal display panel; a cover panel overlaid on a display surface of the liquid crystal display panel; a backlight unit opposed to the liquid crystal display panel; a case covering the backlight unit and the liquid crystal display panel, and including at least a part fixed to the cover panel; and an adhesive provided on the cover panel along the liquid crystal display panel. The adhesive includes a surface opposite to the cover panel, a first area on the surface, and a second area on the surface, located on an inner side closer to the liquid crystal display panel than the first area, the part of the case being adhered to the second area.

The disclosure is a mere example, and arbitrary change of gist which can be easily conceived by a person of ordinary skill in the art naturally falls within the inventive scope. To more clarify the explanations, the drawings may pictorially show width, thickness, shape, etc. of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

(First Embodiment)

Figure 1:
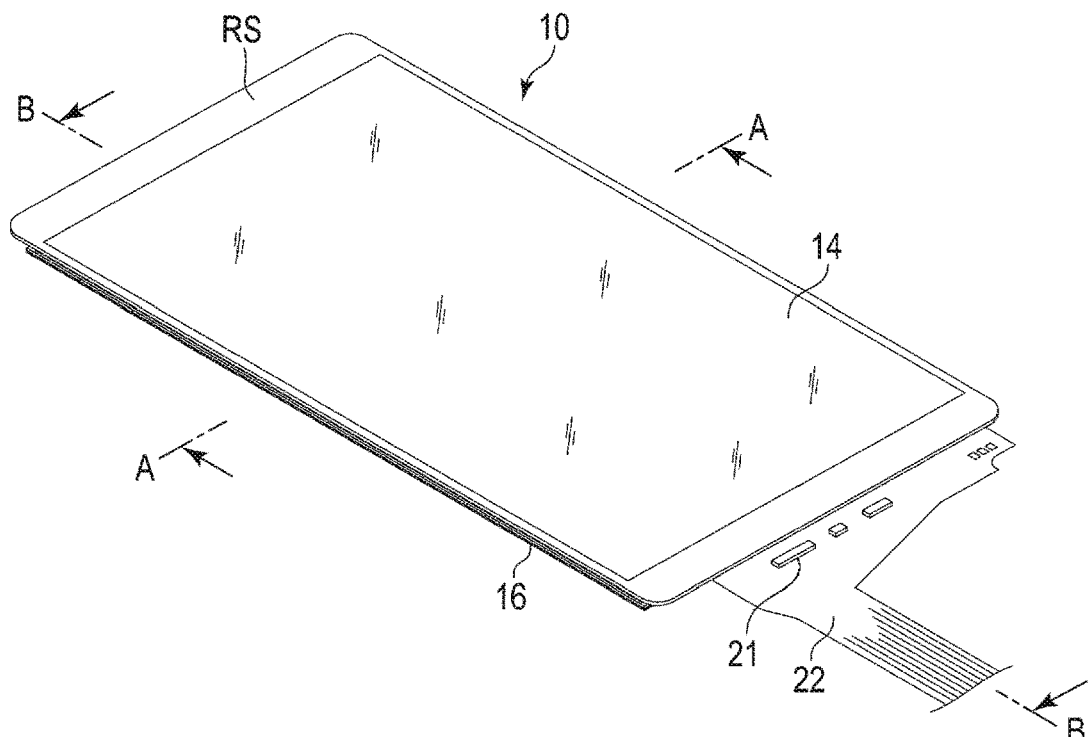
FIG. 1 is a perspective view showing a display surface side of a liquid crystal display device of a first embodiment.
Figure 2:
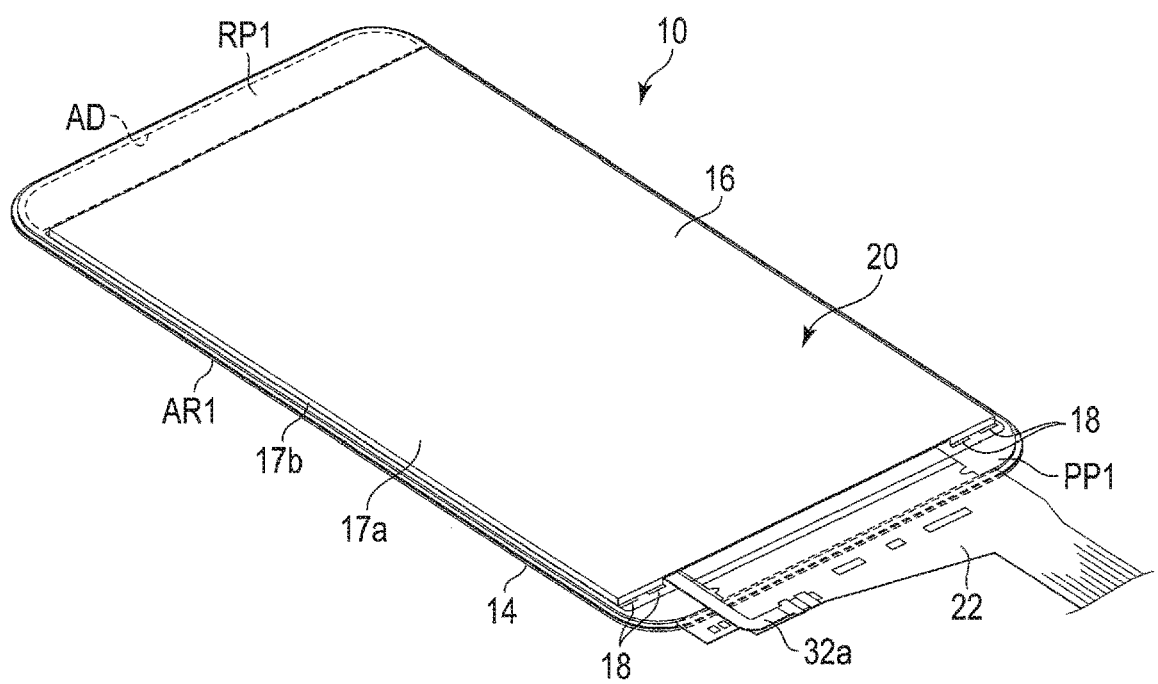
FIG. 2 is a perspective view showing a back surface side of the liquid crystal display device.
Figure 4:
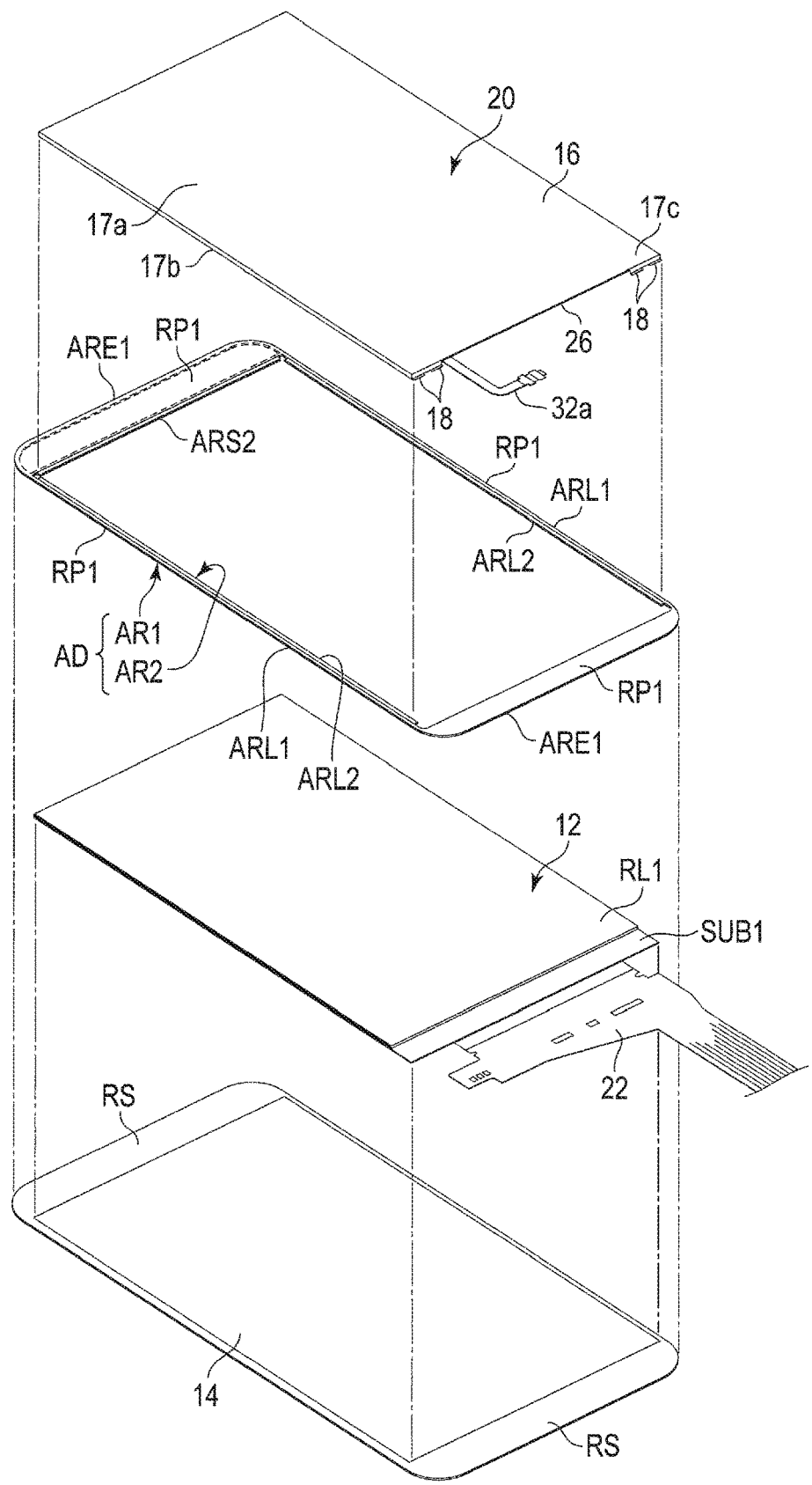
FIG. 4 is an exploded perspective view showing a back surface side of the liquid crystal display device.

FIG. 1 and FIG. 2 are perspective views showing a display surface side and a back surface side of the liquid crystal display device of the first embodiment, and FIG. 3 and FIG. 4 are exploded perspective views showing the display surface side and the back surface side of the liquid crystal display device.

The liquid crystal display device (LCD) 10 can be incorporated for use in, for example, various electronic devices and display devices such as smartphones, tablets, mobile telephones, notebook PCs, portable game consoles, electronic dictionaries, TV sets, and car navigation systems.

As shown in FIGS. 1 to 4, the LCD 10 comprises, a active-matrix flat liquid crystal display panel (hereinafter, referred to a display panel) 12, a transparent cover panel 14 overlaid on a display surface 12a, i.e., a flat surface of the display panel 12 to cover the entire body of the display surface 12a, and a backlight unit 20 serving as a lighting device (back light device) overlaid on a back surface, i.e., the other flat surface of the display panel 12. The LCD 10 comprises a case 16 fixed to the cover panel 14 to cover the display panel 12 and the back surface side of the backlight unit 20.

Figure 5A:
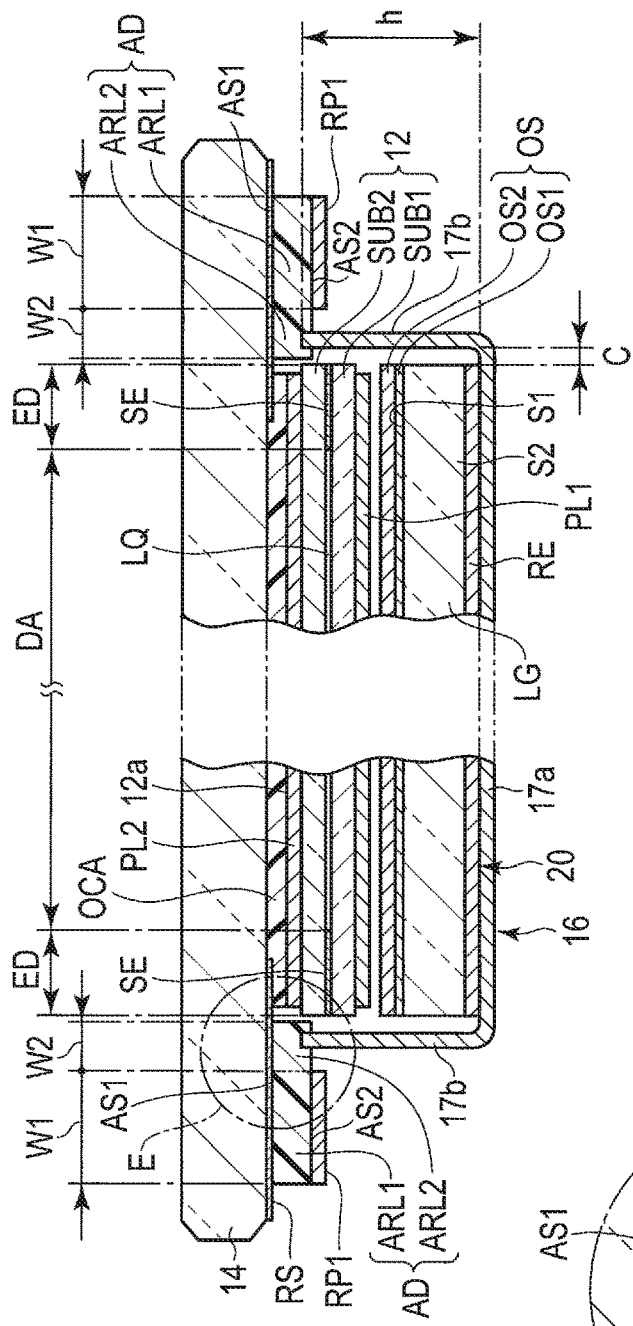
FIG. 5A is a cross-sectional view showing the liquid crystal display device as seen along line A-A in FIG. 1.
Figure 5B:
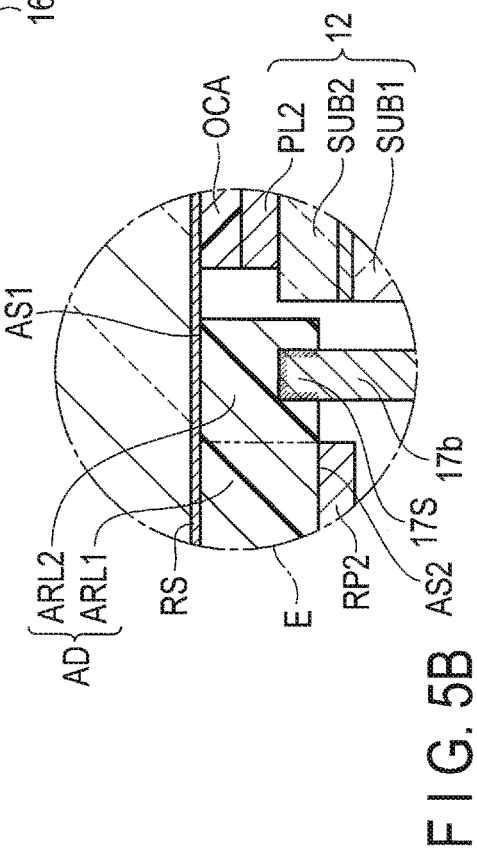
FIG. 5B is a partially enlarged sectional view showing the liquid crystal display device shown in FIG. 5A.

FIG. 5A is a horizontally sectional view showing the liquid crystal display device as seen along line A-A in FIG. 1, FIG. 5B is a cross-sectional view showing a part E shown in FIG. 5A, and FIG. 6 is a longitudinally sectional view showing the liquid crystal display device as seen along line B-B in FIG. 1. As shown in FIG. 3 to FIG. 6, the display panel 12 includes a first substrate SUB1 shaped in a rectangular flat plate, a second substrate SUB2 shaped in a rectangular flat plate and opposed to the first substrate SUB1, and a liquid crystal layer LQ held between the first substrate SUB1 and the second substrate SUB2. A peripheral portion of the second substrate SUB2 is adhered onto the first substrate SUB1 by a sealing member SE. A polarizer PL2 is adhered onto a surface of the second substrate SUB2 to form the display surface 12a of the display panel 12. A polarizer PL1 is adhered onto a surface of the first substrate SUB1 (i.e., the back surface of the display panel 12).

On the display panel 12, a rectangular display area (active area) DA is formed in an area inside the sealing member SE in planar view of the display panel 12, and an image is displayed in the display area DA. In addition, a rectangular frame area ED is formed on the surrounding of the display area DA. The display panel 12 is a transmissive liquid crystal display panel having a transmissive display function of displaying images by selectively transmitting the light from the backlight unit 20 to the display area DA. The display panel 12 may be configured to correspond to a transverse electric field mode primarily using an electric field along the main surface of the substrate or configured to correspond to a vertical electric field mode primarily using an electric field intersecting the main surface of the substrate.

In the example illustrated, a flexible printed circuit (FPC) 22 is joined to an end portion of the short side of the first substrate SUB1 to extend outwardly from the display panel 12. A semiconductor element such as a driving IC chip 21 is mounted on the FPC 22 as a signal supply source which supplies a drive signal to the display panel 12.

As shown in FIGS. 1 to 5A and FIG. 5B, the cover panel 14 is formed of, for example, a glass plate or an acrylic transparent resin and shaped in a rectangular flat plate. The cover panel 14 has larger width and length than dimensions (width and length) of the display panel 12. Thus, the cover panel 14 has a larger area than the display panel 12 in planar view (of visually recognizing the display panel from a normal line of the surface of the display panel, which will also be explained below). A frame-shaped light-shielding layer RS is formed on the back surface of the cover panel 14 (i.e., the surface on the display panel side or the surface opposite to the display surface opposed to an observer who visually recognizes the display surface from the front surface). Regions other than the region of the display panel 12 which is opposed to the display area DA, on the cover panel 14, are blocked from light by the light-shielding layer RS. The light-shielding layer RS may be formed on an upper surface (display surface) of the cover panel 14.

The back surface of the cover panel 14 is adhered onto the polarizer PL2 of the display panel 12 by a transparent adhesive or tackiness agent, for example, an adhesive sheet OCA formed of optical transparent resin, to entirely cover the display surface 12a of the display panel 12. The adhesive sheet OCA is formed in the same size as the polarizer PL2, and aligned with the polarizer PL2 and adhered onto the polarizer PL2.

The peripheral portion of the cover panel 14 protrudes to the outside from the outer periphery of the display panel 12. Each long side of the cover panel 14 and a long side of the display panel 12 are spaced apart by a predetermined gap in a substantially parallel state. Each short side of the cover panel 14 and a short side of the display panel 12 are spaced apart by a predetermined gap in a substantially parallel state. In the present embodiment, the gap between the long side of the cover panel 14 and the long side of the display panel 12, i.e., the width of the peripheral portion on the long side of the cover panel 14 is formed to be smaller than the gap between the short side of the cover panel 14 and the short side of the display panel 12, i.e., the width of the peripheral portion on the short side of the cover panel.

A frame-shaped adhesive AD is formed (adhered) on the surrounding of the display panel 12, on the back surface of the cover panel 14. The adhesive AD is formed of, for example, a hot-melt resin adhesive of thermoplastic plastic, vinyl acetate resin and the like. The adhesive AD is overlaid on the light-shielding layer RS. As shown in FIG. 5A, FIG. 5B, and FIG. 6, the adhesive AD includes a first surface AS1 which is flat and opposed to the cover panel 14, a second surface AS2 which is flat and is on the side opposite to the first surface AS1, and side surfaces which extend substantially vertically to the cover panel 14. The second surface AS2 of the adhesive AD includes a first area AR1 in which a housing of a set housing to be explained later is stuck, and a second area AR2 which is located inside, i.e., on the display panel side lather than the first area AR1 and to which a case 16 is fixed. A transverse section of each portion of the adhesive AD is substantially shaped in a rectangle, a pair of long sides formed of the first surface S1 and the second surface S2 are located parallel to the back surface of the cover panel 14, and a pair of short sides formed of the side surfaces are located substantially vertically to the back surface of the cover panel 14. In addition, the thickness of the adhesive AD (i.e., the gap between the first surface S1 and the second surface S2) is slightly greater than a sum of the thickness of the polarizer PL2 and the thickness of the adhesive sheet OCA.

As shown in FIG. 3 to FIG. 6, the first area AR1 of the adhesive AD is substantially shaped in a rectangle frame, and includes a pair of first longwise bars ARL1 each extending along the long side of the display panel 12, a pair of first sidelong bars ARS1 each extending along the short edge of the display panel 12, and a pair of outer peripheral portions ARE1 which are great in width and extend along the edge of each short side of the cover panel 14. In addition, the second area AR2 includes a pair of second longwise bars ARL2 which are located inside the first longwise bars ARL1 and extend along the long side of the display panel 12, and a second sidelong bar ARS2 which is located inside the first sidelong bars ARS1 and extends along one of the short sides of the display panel 12 (i.e., the short side opposite to a light source to be explained later).

As shown in FIG. 5A, FIG. 5B, and FIG. 6, at a pair of longwise bars and one of sidelong bars, a width W1 of the first area AR1 (including the first longwise bar ARL1 and the first sidelong bar ARS1) is set to be in a range of, for example, 0.6 to 0.8 mm (600 to 800 µm), and a width W2 of the second area AR2 (including the second longwise bar ARL2 and the second sidelong bar ARS2) is set to be in a range of, for example, approximately 0.2 to 0.4 mm (200 to 400 µm). In addition, a width W3 of each of the outer peripheral portions ARE1 of the first area AR1 is set to be in a range of, for example, 0.6 to 1.2 mm (600 to 1200 µm). The thickness of the adhesive AD is set to be approximately 240 µm. Furthermore, a first paper RP1 having substantially the same shape and dimensions as the first area AR1 is adhered on the first area AR1 of the adhesive AD to cover the first area AR1, before the LCD 10 is built in the set housing, i.e., before the LCD 10 is built in the display device or the electronic device.

As shown in FIG. 2 to FIG. 6, the case 16 covering the backlight unit 20 is formed of a thin plate. The case 16 is shaped in a flat rectangular box (rectangular lid) by, for example, processing a stainless plate having a thickness of 0.1 mm by bending, press forming or the like. As the thickness of the case 16 is smaller, the frame can be narrower and the display device itself can be slimmer. For example, a stainless plate having a thickness of 0.1 mm is used but, if a sheet metal having a thickness of 0.05 mm is used, the frame can be thinner by 0.05 mm and the entire device can be slimmer by 0.05 mm.

The case 16 is larger than the dimensions of the display panel 12 and smaller than the dimensions of the cover panel 14 in planar view. The case 16 includes a rectangular bottom wall 17a, and a pair of side walls (first side walls) 17b of the long sides and a pair of side walls (second side walls) 17c of the short sides standing upright along respective side edges of the bottom wall 17a. In the present embodiment, the side walls 17b of the long sides stand substantially vertically to the bottom wall 17a and extend along the entire long sides of the bottom wall 17a. The side walls 17c on the short side stand substantially vertically to the bottom wall 17a and extend along the entire short sides of the bottom wall 17a. A height h of the side walls 17b and 17c from the bottom wall 17a is set to be slightly smaller than a sum of the thickness of the display panel 12 and the thickness of the backlight unit 20 to be explained later and to reach the above-explained adhesive AD.

In the present embodiment, the case 16 includes flanges 18 extending from the top edge of one of the side walls of the short sides or the side wall 17c located on the light source side to be explained later to the outside. In addition, an opening 26 through which the FPC 22 and an FPC of the backlight unit 20 are inserted is formed on the side wall 17c. The flanges 18 are formed on both sides of the opening 26.

As shown in FIG. 2, FIG. 5A, FIG. 5B and FIG. 6, the case 16 configured as explained above is disposed to cover the backlight unit 20 and the display panel 12, and at least several parts of the case 16 are fixed (applied) to the cover panel 14 by the adhesive AD. In the present embodiment, the end top edges of the side walls 17a and 17b of the case 16 are fixed to the cover panel 14 by sticking the end top edges on the lower surface of the cover panel 14 with a double-faced tape 24 and the adhesive AD common to that for fixing the case.

Other than the side wall (side wall on the light source side) 17c of one of the short sides of the case 16, the side wall 17c on the other short side and the pair of side walls 17b of the long sides are opposed to and spaced apart from the side edge corresponding to the display panel 12 by a very small gap C (in a range of, for example, 0.05 to 0.15 mm). Top edges 17S (see FIG. 5B) of the side walls 17b and 17c are fit in the second areas AR2 (ARL2 and ARS2) of the adhesive AD and stuck and fixed on the cover panel 14 by the adhesive AD. As shown in FIG. 5B, surfaces of the top edges 17S of the side walls 17b and 17c are processed more roughly than surfaces of the other portions of the case 16 and have appropriate roughness to increase the fixing force with the adhesive AD. For example, roughness can be formed by rubbing the surfaces of the top edges 17S with a rough file or the surfaces of the top edges 17S of the side walls 17b and 17c can be formed roughly by a surface treatment such as making the surfaces rough by washing the top edges 17S in an acid. The fixing force of the top edges 17S on the adhesive AD can be thereby increased and the anchoring effect can be obtained.

As shown in FIG. 5A, FIG. 5B, and FIG. 6, the side walls 17b and 17c are fixed on the second areas AR2 of the adhesive AD, in a state in which the adhesive AD is interposed between upper edges of the side walls 17b and 17c and the back surface (light-shielding layer RS) of the cover panel 14, in a direction of thickness of the adhesive AD. By causing the adhesive AD to be thus interposed, the top edges 17S of the side walls can be prevented from directly touching and hurting the back surface or the light-shielding layer RS of the cover panel 14. In addition, distortion in the case 16 (for example, drop of an iron ball or the like) can hardly be transmitted to the display panel 12 by elasticity of the adhesive AD and breakage of the display panel 12 can be avoided. By using a material which can stretch flexibly and easily as the adhesive AD, static distortion (for example, bending based on the difference in coefficient of linear expansion) can hardly be transmitted to the display panel 12 and non-uniformity in gap of the display panel 12 can be avoided.

As shown in FIG. 6, the side wall 17c of the short side is opposed to the short side of the display panel 12 via a gap comparatively larger than the gap C between the other side walls and the display panel 12. The flanges 18 of the side wall 17c are stuck and fixed on the cover panel 14 by the double-faced tape 24. To fix the flanges 18 on the cover panel 14, several parts of the above-explained adhesive AD may be used besides the double-faced tape 24 or an epoxy adhesive, a UV curing adhesive and the like may be used.

The bottom wall 17a of the case 16 is opposed substantially parallel to and spaced apart from the back surface of the display panel 12 in a state in which the case 16 is attached to the cover panel 14. The FPC 22 extending from the display panel 12 extends outside the case 16 through the opening 26 on the side wall 17c.

Three side walls of the case 16 do not need to be fixed in the second area AR2 of the adhesive AD by the top edges of the side walls of the case 16 but, in particular, a pair of side walls 17b of the long sides alone which are required to have narrow edges may be fixed. In this case, the flange may be formed on the side wall 17c of the other short side and strongly fixed on the cover panel 14 by the adhesive layer or the like.

As shown in FIG. 3 to FIG. 6, the backlight unit 20 is placed in the case 16 and opposed to the back surface of the display panel 12. The backlight unit 20 comprises a light guide LG shaped in a rectangular flat plate, a rectangular reflective sheet RE, an optical sheet OS overlaid on the light guide LG, and a light source unit 30 which makes light incident on the light guide LG.

The reflective sheet RE is placed on the bottom wall 17a of the case 16 and opposed to the substantially entire surface of the bottom wall 17a. The light guide LG includes a first main surface S1 serving as a plane of emission, a second main surface S2 on the side opposite to the first main surface S1, and an incident end surface EF which connects the first main surface S1 and the second main surface S2. In the present embodiment, a side surface on the short side of the light guide LG is handled as a plane of incidence ER The light guide LG is formed to have dimensions (length and width) slightly smaller than the inside dimensions of the case 16 and slightly larger than the dimensions of the display area DA of the display panel 12. In the thickness of the light guide LG, the side surface (plane of incidence) side opposed to the light source unit 30 is thickest and the other side surface side which is just opposite to the side surface is thinnest. The light guide LG is overlaid on the reflective sheet RE in a state in which the second main surface S2 is opposed to the reflective sheet RE. The plane of incidence EF of the light guide LG is opposed to and spaced apart from the side wall 17c on the short side of the case 16 by a gap. The other side surfaces of the light guide LG are opposed to and spaced apart from the side walls 17b and 17c of the case 16 by a small gap in a range of approximately 0.05 to 0.2 mm (50 to 200 μm).

Optical sheets OS have a light transmitting property and are overlaid on the first main surface S1 of the light guide LG In the present embodiment, for example, a diffusion sheet OS1 and a prism sheet OS2 formed of synthetic resin such as polyethylene terephthalate are used as the optical sheets OS. The optical sheets OS are overlaid in order on the first main surface S1 of light guide LG Each of the optical sheets OS is formed to have the same width as the width of the light guide LG, a length slightly smaller than the length of the light guide LG, and dimensions slightly larger than the dimensions of the display area DA of the display panel 12. At least three side edges other than the side edge of the light source side, of the optical sheets OS, are opposed to and spaced apart from the case 16 by a predetermined gap (0.1 to 0.2 mm). The optical sheets OS are opposed to and spaced apart from the back surface of the liquid crystal display panel 12 by a small gap, and is further opposed to the entire display area DA of the display panel 12.

As shown in FIG. 3 and FIG. 6, the light source unit 30 comprises a printed circuit (FPC) 32 shaped in an elongated strip, light sources, for example, light-emitting diodes (LED) 34 mounted on the FPC 32, and a rod-shaped support frame 36 disposed on the short side end portion of the case 16. The LEDs 34 are arranged in a longitudinal direction of the FPC 32 (i.e., a direction parallel to the short side of the case 16). In addition, the FPC 32 includes a connection end portion 32a extending from one of side edges.

One of longwise bars of the FPC 32 is stuck on the support frame 36 by the adhesive layer 35, and the other longwise bar is stuck on an end portion on the side of the plane of incidence EF of the light guide LG by the adhesive layer 35. The LEDs 34 are thereby disposed between the side wall 17c on the short side of the case 16 and the plane of incidence EF of the light guide LG, and each of the LEDs 34 is opposed to the plane of incidence EF. Each LED 34 has a height (thickness) of, desirably, for example, 0.4 mm (400 μm) or less, and more desirably, 0.3 mm (300 μm) or less.

The connection end portion 32a of the FPC 32 extends to the outside of the case 16 through the opening 26 of the side wall 17c of the case 16 and is electrically connected to the FPC 22. As shown in FIG. 6, the en portion on the light source side of the lowermost optical sheet OS1 extends to the light source side beyond the end portion of the optical sheet OS2 and is joined to the FPC 32 by a double-faced tape (not shown).

According to the backlight unit 20 configured as explained above, a drive current flows to the LED 34 via the FPC 22 and FPC 32. The light emitted from the LED 34 is made incident in the light guide LG from the plane of incidence EF of the light guide LG, propagates inside the light guide LG or is emitted from the second main surface S2 of the light guide LG and then reflected by the reflective sheet RE, and is made incident in the light guide LG again. After passing through such an optical path, the light from the LED 34 is emitted from the entire surface of the first main surface (emission surface) S1 to the display panel 12 side. The emitted light is diffused by the optical sheets OS and applied to the display area DA of the display panel 12.

According to the LCD 10 configured as explained above, the number of members can be reduced, the manufacturing costs can be reduced and the manufacturing process can be simplified by fixing the case 16 of the backlight unit 20 and the set housing on the cover panel 14 by the common adhesive AD, as compared with separately disposing the double-faced tape and the adhesive layer for fixing the set housing. In addition, if the adhesive layer for fixing the case and the adhesive layer for fixing the set housing are disposed separately and independently, tolerance, i.e., gap occurs between the adhesive layers and the frame width becomes greater accordingly. In contrast, if the adhesive layers are formed of the single adhesive AD, the tolerance does not occur and the first area for fixing the set housing can be disposed to be close to the second area. The adhesive AD can be disposed to be close to the display panel 12 and the display device can be shaped in a slimmer frame.

Next, an example of the adhesive sheet used for manufacturing the LCD 10 and an example of a method of manufacturing the liquid crystal display device using the adhesive sheet will be explained.

Figure 7:
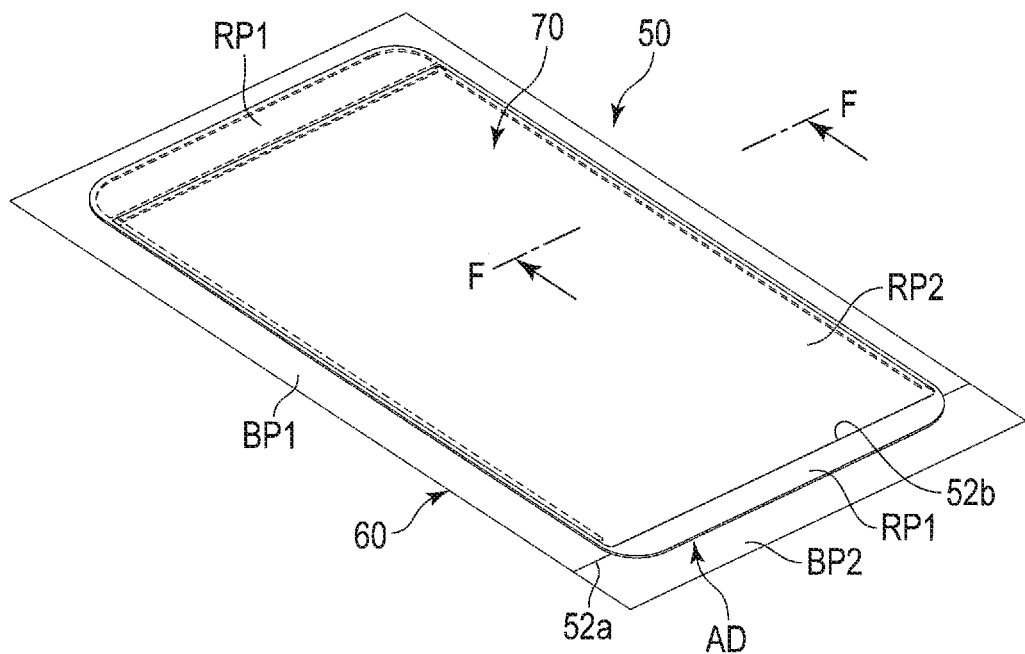
FIG. 7 is a perspective view showing an adhesive sheet used for manufacturing the liquid crystal display device.
Figure 8:
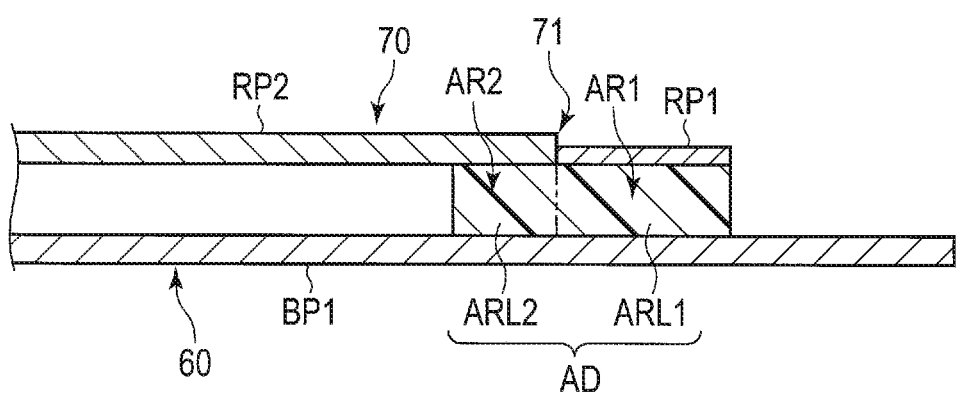
FIG. 8 is a cross-sectional view showing the adhesive sheet as seen along line F-F in FIG. 7.
Figure 9:
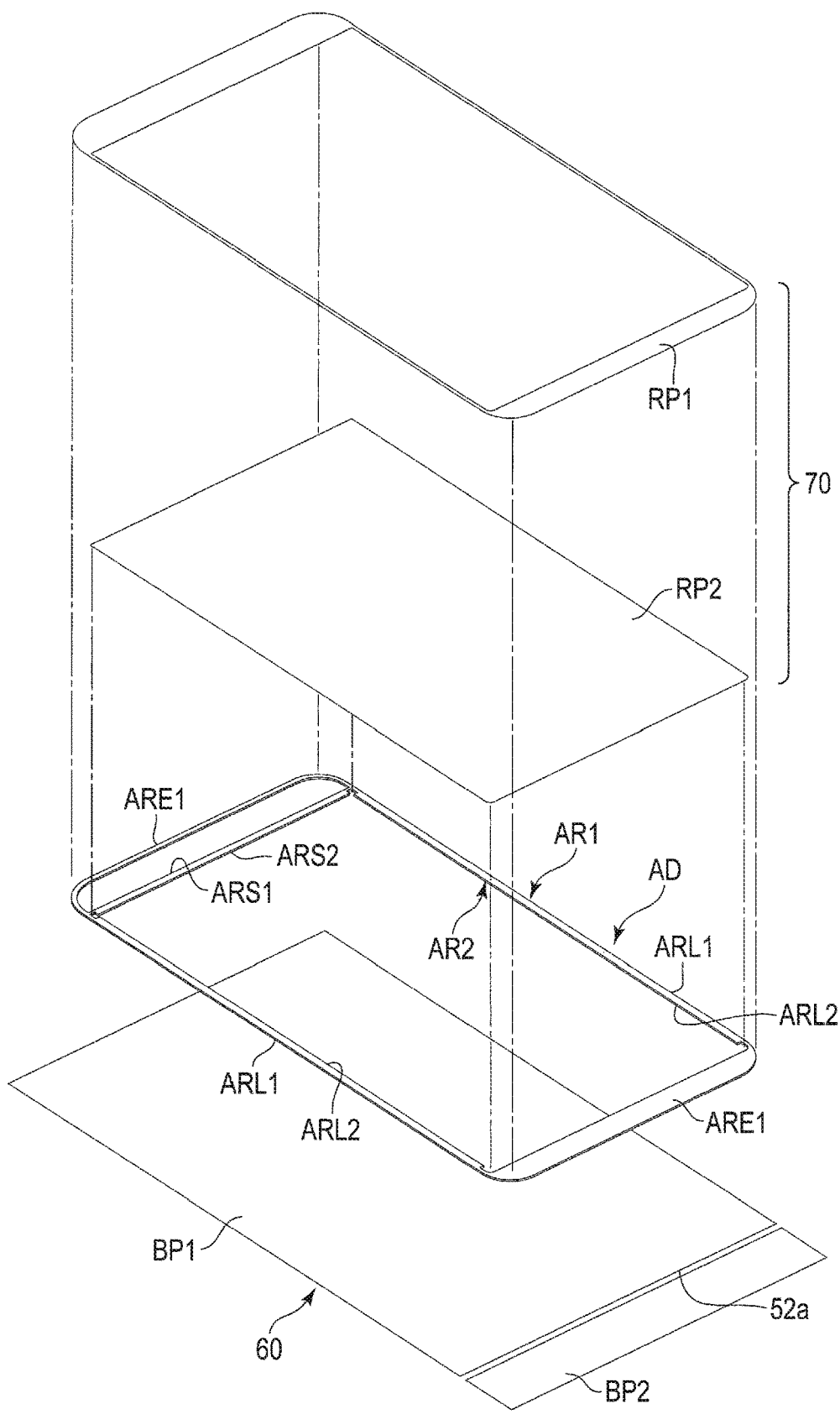
FIG. 9 is an exploded perspective view showing the adhesive sheet.

FIG. 7 is a perspective view showing the adhesive sheet, FIG. 8 is a cross-sectional view showing the adhesive sheet as seen along line F-F in FIG. 7, and FIG. 9 is an exploded perspective view showing the adhesive sheet.

As shown in FIG. 7 to FIG. 9, an adhesive sheet 50 includes a mount 60, the above-explained adhesive AD placed and stuck on the mount 60, and release paper 70 which is overlaid and stuck on the adhesive AD and can be released.

The adhesive AD is formed of, for example, a hot-melt resin adhesive of thermoplastic plastic, vinyl acetate resin and the like. The adhesive AD includes a first area AR1 in which a housing of a set housing to be explained later is stuck, and a second area AR2 which is located inside the first area AR1 and in which several parts of the case 16 are fixed. The first area AR1 includes a pair of first longwise bars ARL1, a pair of first sidelong bars ARS1 and a pair of outer peripheral portions ARE1 which are great in width. The second area AR2 includes a pair of second longwise bars ARL2 which are located inside the first longwise bars ARL1 and extend parallel to the first longwise bars ARL1, and the second sidelong bar ARS2 which is located inside the first sidelong bars ARS1 and extends parallel to the first sidelong bars ARS1.

The mount 60 includes a rectangular first mount BP1 having greater width and length than the adhesive AD, and a second mount BP2 sufficiently smaller than the first mount BP1. The first mount BP1 and the second mount BP2 are arranged in a state in which side edges 52a are in contact with each other.

One of the outer peripheral portions ARE1 of the adhesive AD is placed on the second mount BP2, and the other portions of the adhesive AD are placed on the first mount BP1. A boundary (of the side edges 52a) between the first mount BP1 and the second mount BP2 is aligned with inner side edges of the outer peripheral portions ARE1.

The release paper 70 includes first paper RP1 and second paper RP2 which are independent of each other. The first paper RP1 is formed in a frame having the same shape and dimensions as the first area AR1 of the adhesive AD. The first paper RP1 is overlaid and stuck on the first area AR1 of the adhesive AD to cover the entire surface of the first area AR1. The second paper RP2 is formed in a rectangle having substantially the same shape and dimensions as an inner space of the first paper RP1. The second paper RP2 is disposed to be fit in the inner space of the first paper RP1, and its peripheral portion is overlaid and stuck on the second area AR2 of the adhesive AD to cover the entire surface of the second area AR2.

The first paper RP1 and the second paper RP2 are formed to be releasable from the adhesive AD independently of each other. As shown in FIG. 8, the second paper RP2 is formed to be thicker than the first paper RP1, and each of the side edges of the second paper RP2 is in contact with the inner side edge of the first paper RP1 to form a difference in level 71, in the present embodiment. As described later, the second paper RP2 is released prior to the first paper RP1 when the liquid crystal display device is manufactured. In the release, the second paper RP2 alone can easily be released with the difference in level 71 on the boundary between first paper RP1 and the second paper RP2.

In addition, a slit (gap) 52b is formed between one of short sides of the second paper RP2 and one of the inner side edges of the first paper RP1 which is opposed to the short side. The slit 52b is located to be aligned with the inner side edge of one of the outer peripheral portions ARE1 of the adhesive AD, and the above-explained side edge 52a of the first mount BP1.

Next, an example of the method of manufacturing the liquid crystal display device using the adhesive sheet 50 will be described.

Figure 10:
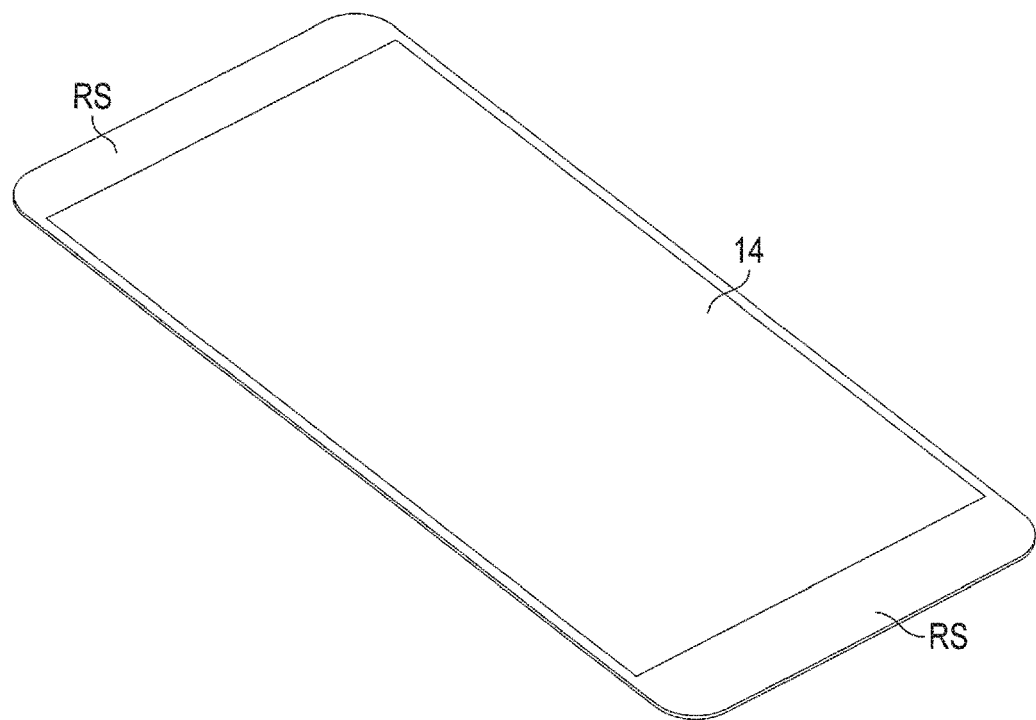
FIG. 10 is a perspective view showing a cover panel used for a process of manufacturing the liquid crystal display device.
Figure 11:
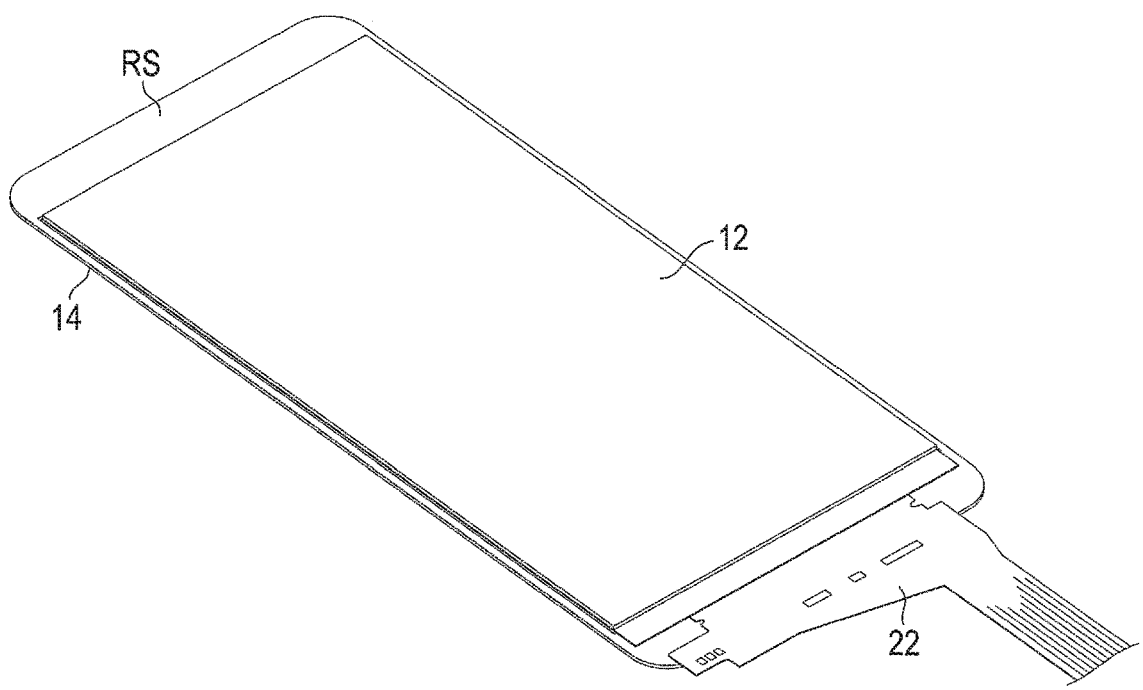
FIG. 11 is a perspective view showing a state of bonding a liquid crystal display panel on a cover panel in the manufacturing process.
Figure 12:
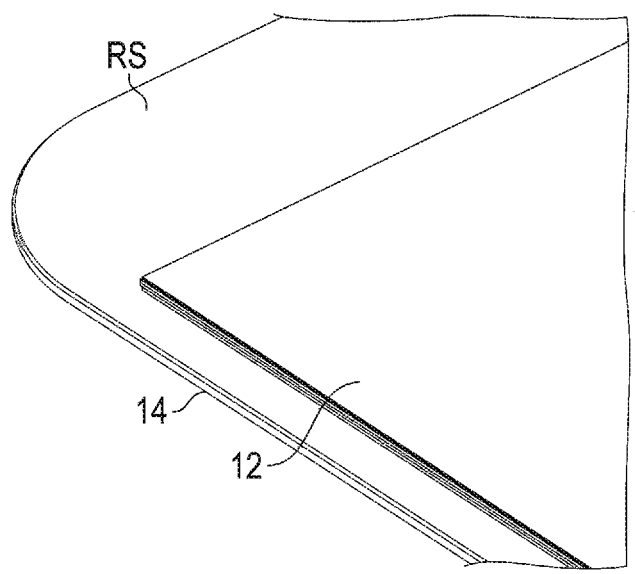
FIG. 12 is a partially enlarged perspective view showing the cover panel.

As shown in FIG. 10, the cover panel 14 on which the light-shielding layer RS is formed is first prepared. As shown in FIG. 11 and FIG. 12, the display panel 12 is stuck on a predetermined position on the cover panel 14 by the adhesive sheet OCA formed of an optical transparent resin. At this time, the display panel 12 is disposed such that the peripheral portion (frame area) of the display panel 12 is partially overlaid on the light-shielding layer RS.

Figure 13:
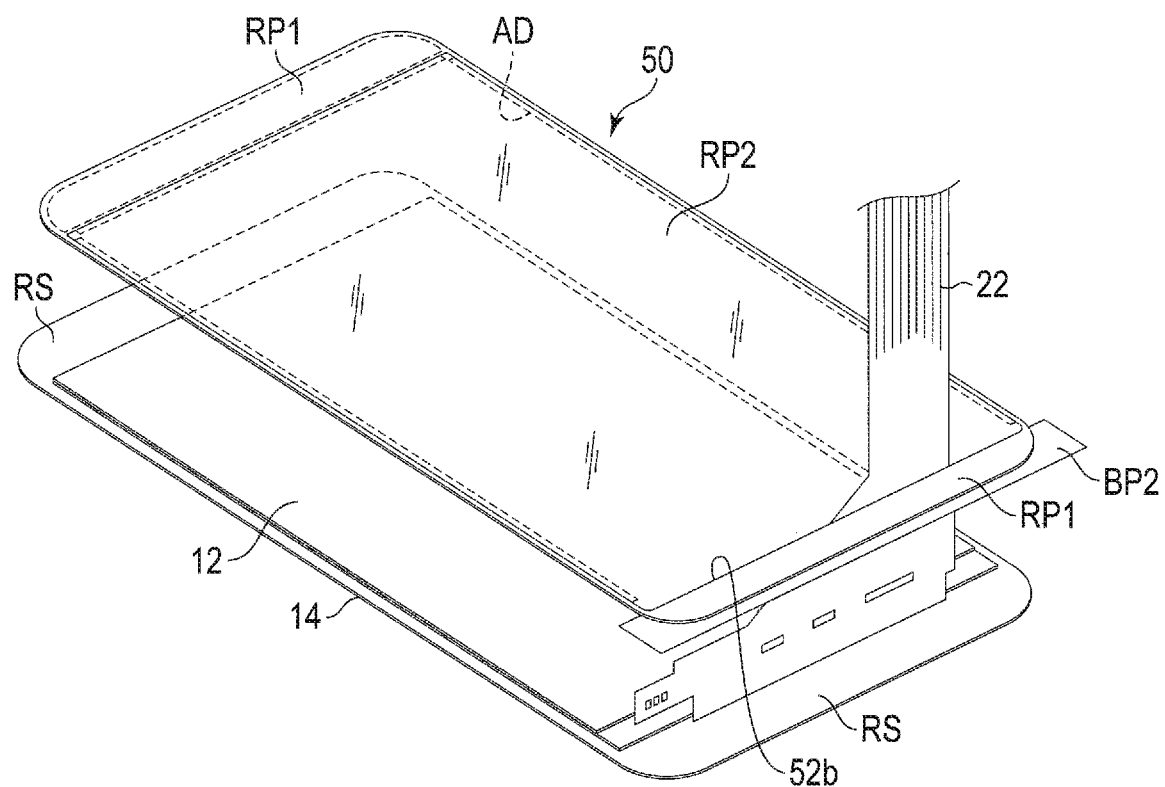
FIG. 13 is an exploded perspective view showing the cover panel and the adhesive sheet to which the liquid crystal display panel is adhered, in the manufacturing process.

As shown in FIG. 13, the above-explained adhesive sheet 50 is prepared, and disposed above the display panel 12 and the cover panel 14 in a state in which the first mount BP1 alone is released. At this time, the FPC 22 of the display panel 12 is bent upwardly and inserted into the slit 52b of the adhesive sheet 50. After the second mount BP2 and the second paper RP2 are released, in this state, the adhesive AD is overlaid and stuck on the light-shielding layer RS of the cover panel 14, as shown in FIGS. 14 and 15. At this time, a rectangular opening portion having slightly larger inner dimensions than the outer shape of the display panel 12 is formed by the pair of second longwise bars ARL2 of the second area AR2 of the adhesive AD and the portion corresponding to the second sidelong bar ARS2 and one of the outer peripheral portions ARE1 of the first area ARE1. The adhesive AD can easily be stuck on the cover panel 14 with high accuracy by using side portions of the opening portion as sticking guides for the display panel. Thus, the adhesive AD is disposed on the surrounding of the display panel 12, and the second area AR2 of the adhesive AD from which the second paper RP2 is released is exposed from the surrounding of the display panel 12.

Figure 16:
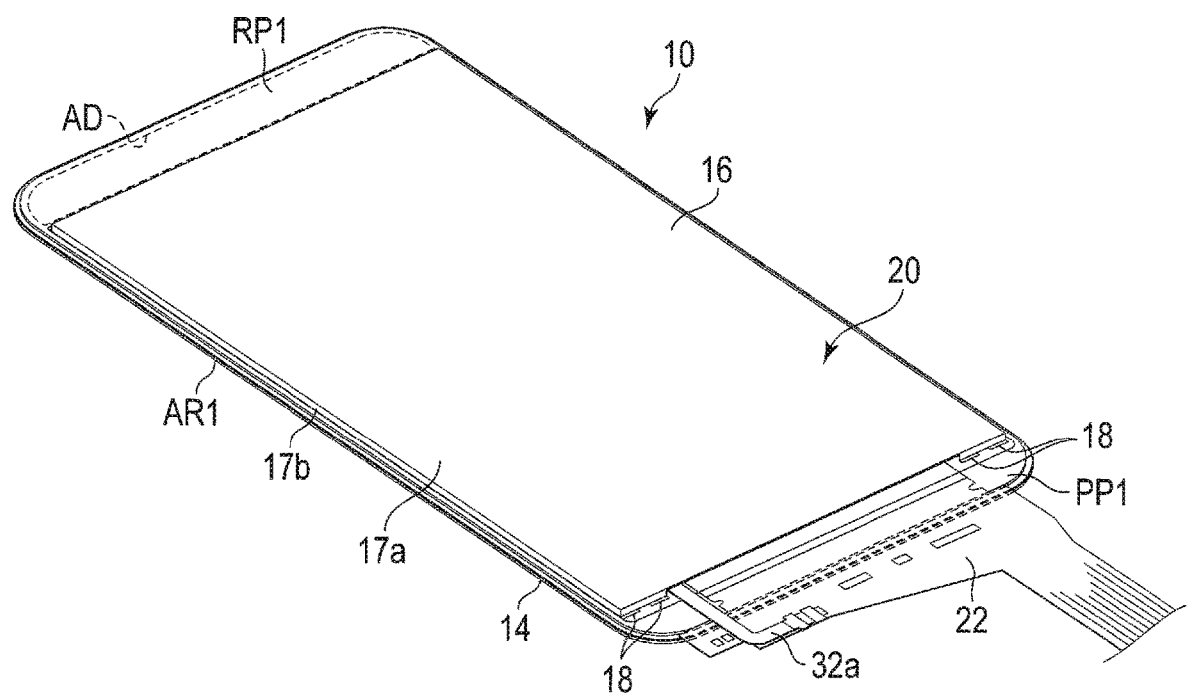
FIG. 16 is a perspective view showing the liquid crystal display device in a state in which the case is attached to the display device in the manufacturing process.
Figure 17:
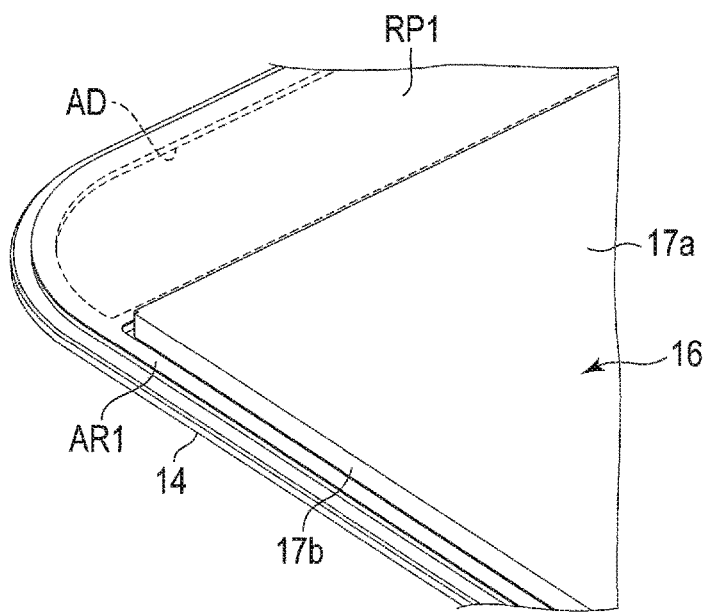
FIG. 17 is a partially enlarged perspective view showing the liquid crystal display device.

Next, as shown in FIG. 16 and FIG. 17, the backlight unit 20 is disposed in the case 16 and then the case 16 and the backlight unit 20 are disposed on the back surface side of the display panel. Furthermore, the top edges of the side walls 17b and 17c of the case 16 are fit in the second areas AR2 of the adhesive AD and fixed on the cover panel 14 by the adhesive AD. Simultaneously, the flanges 18 of the case 16 are stuck on the cover panel 14 by a double-faced tape (not shown). The LCD 10 can be obtained in the above-described process.

The first release sheet RP1 of the adhesive sheet 50 is released from the adhesive AD when the LCD 10 is embedded in the set housing and the like. The first release sheet RP1 is maintained in a state of being stuck on the adhesive AD until this time.

According to the method of manufacturing the liquid crystal display device, the adhesive layer for fixing the case and for fixing the set housing can be formed, the number of manufacturing steps can be reduced and the manufacturing costs can be reduced by only sticking the adhesive AD formed in a predetermined shape on the cover panel 14.

Thus, according to the present embodiment, the display device capable of being a further slimmer frame, the adhesive sheet, and the method of manufacturing the display device can be obtained.

Next, a display device of another embodiment and an adhesive sheet of a modified example will be explained. The same portions as those of the first embodiment, in another embodiment and the modified example described below, are denoted by the same reference numerals, their detailed explanations are omitted or simplified, and portions different from the first embodiment will be mainly explained in detail.

(Second Embodiment)

Figure 18:
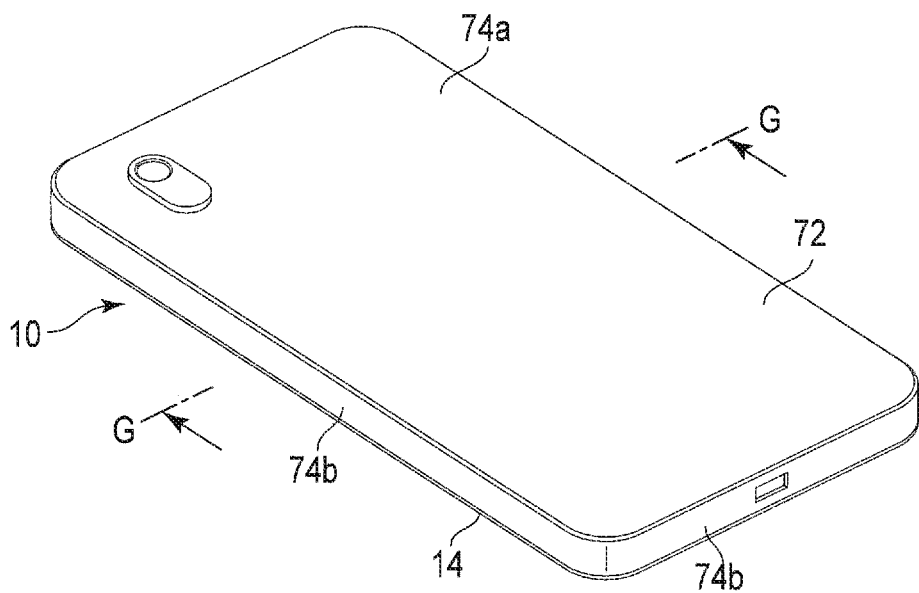
FIG. 18 is a perspective view showing the liquid crystal display device in a state in which a housing is attached to the display device.
Figure 19:
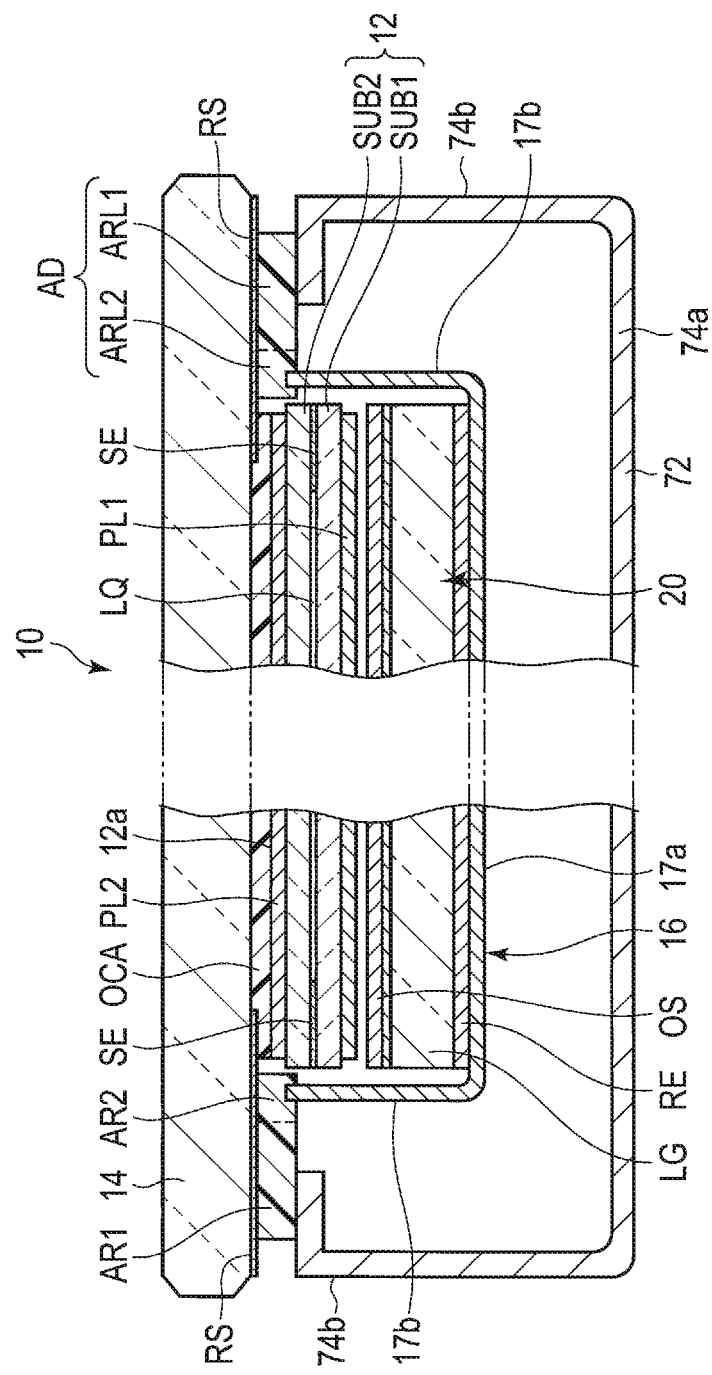
FIG. 19 is a cross-sectional view showing the display device as seen along line G-G in FIG. 18.
Figure 20:
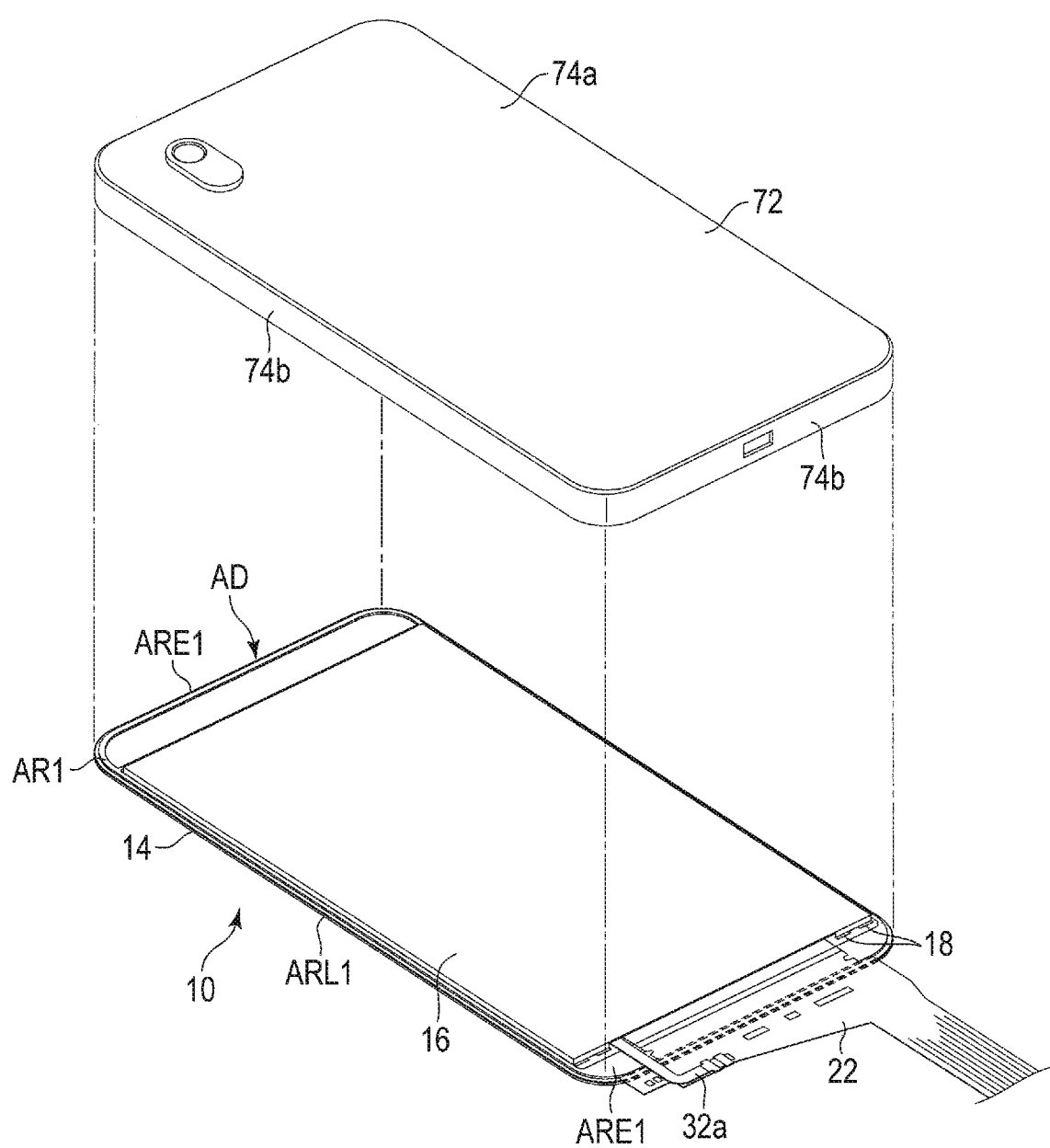
FIG. 20 is an exploded perspective view showing the liquid crystal display device and the housing.

FIG. 18 is a perspective view showing a liquid crystal display device of the second embodiment, FIG. 19 is a cross-sectional view showing the liquid crystal display device as seen along line G-G in FIG. 18, and FIG. 20 is an exploded perspective view showing the liquid crystal display device.

According to the present embodiment, the liquid crystal display device further comprises a housing 72 as a set housing. The housing 72 comprises a rectangular bottom wall 72a having substantially the same size as a cover panel 14, and side walls 74b formed to stand along a peripheral edge of the bottom wall 72a, and is integrally formed of a synthetic resin or metal. The housing 72 is disposed on a back surface side of the cover panel 14 to cover a case 16, and upper end surfaces of the respective side walls 74b are stuck on a first area AR1 of an adhesive AD. The housing 72 is thereby fixed on the cover panel 14 by the adhesive AD. The other constituent elements of the LCD 10 are the same as those of the liquid crystal display device of the first embodiment.

According to the second embodiment configured as explained above, the number of members can be reduced, the manufacturing costs can be reduced and the manufacturing process can be simplified by fixing the case 16 of the backlight unit 20 and the housing 72 on the cover panel 14 by the common adhesive AD. The adhesive AD can be disposed to be close to the display panel 12 and the display device can be shaped in a slimmer frame.

(First Modified Example)

Figure 21:
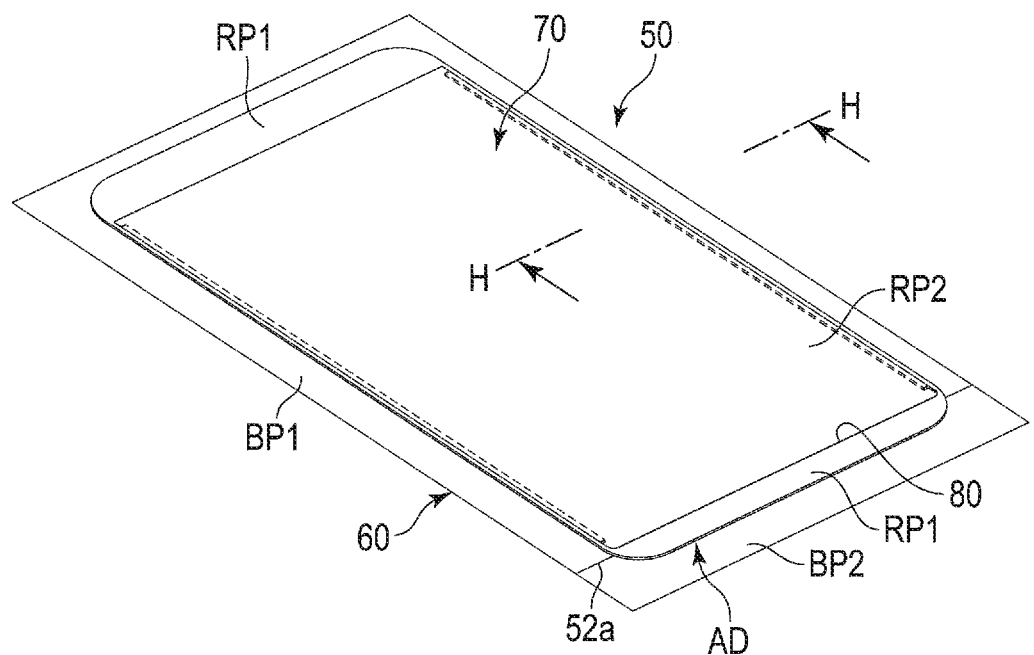
FIG. 21 is a perspective view showing an adhesive sheet of a modified example.
Figure 22:
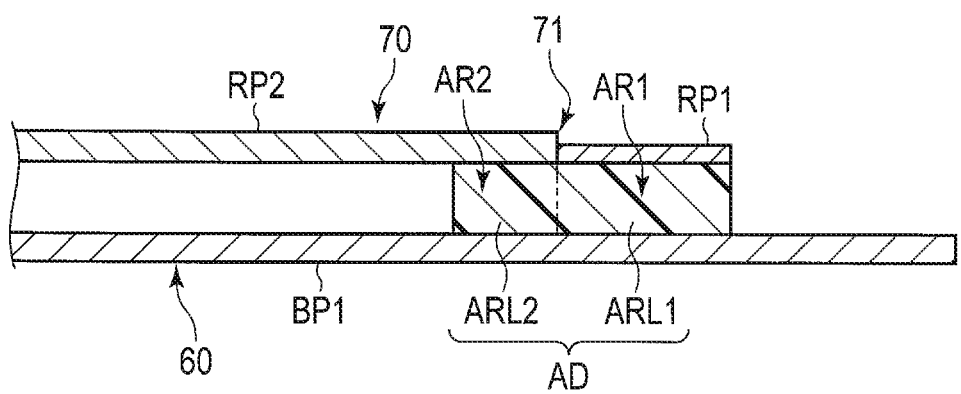
FIG. 22 is a cross-sectional view showing the adhesive sheet as seen along line H-H in FIG. 21.
Figure 23:
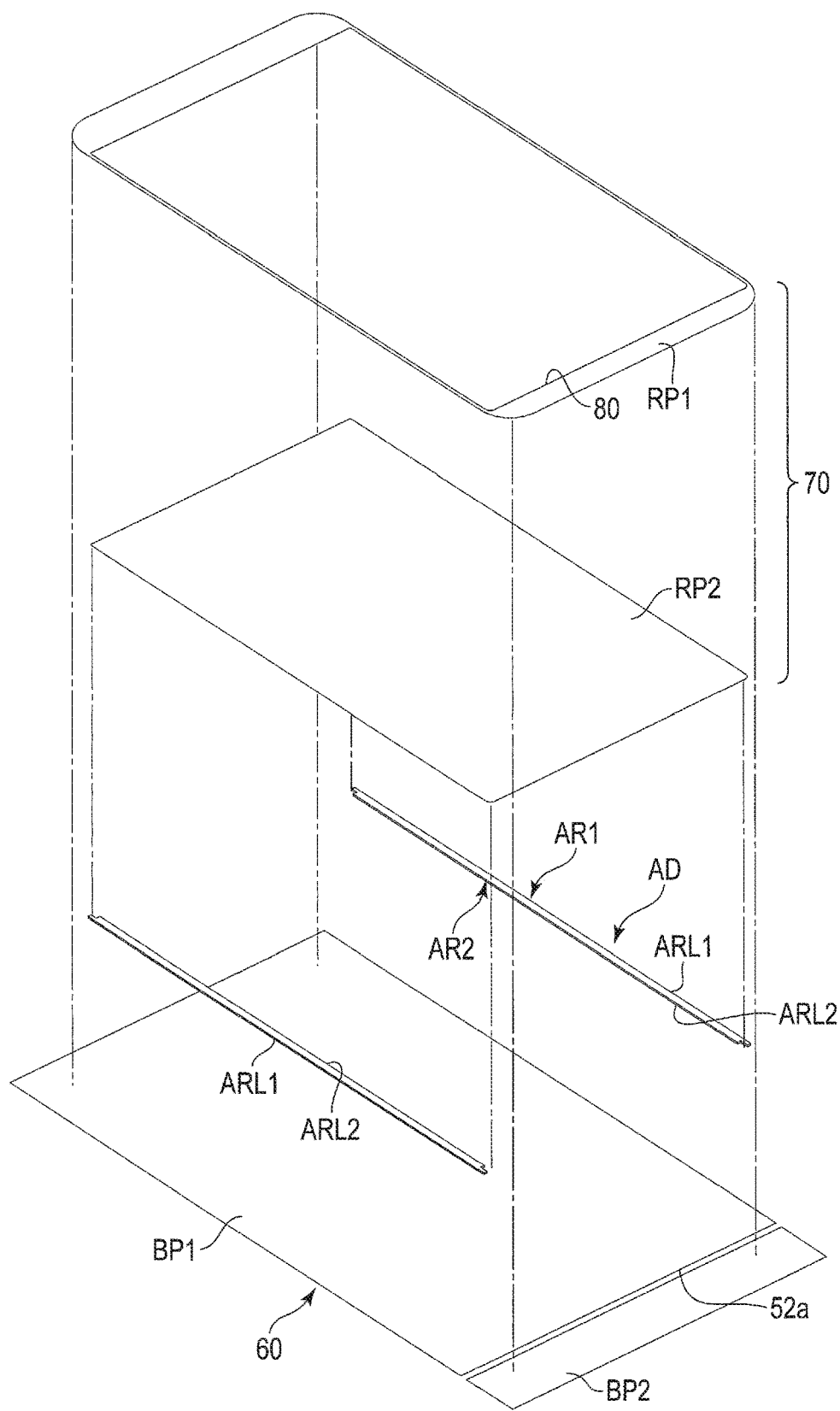
FIG. 23 is an exploded perspective view showing the adhesive sheet.

FIG. 21 is a perspective view showing the adhesive sheet of the first modified example, FIG. 22 is a cross-sectional view showing the adhesive sheet as seen along line H-H in FIG. 21, FIG. 23 is an exploded perspective view showing the adhesive sheet, and FIG. 24 is an exploded perspective view showing a step of sticking the adhesive sheet on the cover panel on which the display panel is stuck. As shown in FIG. 21 to FIG. 23, according to the first modified example, the adhesive sheet 50 includes a mount 60, the adhesive AD placed and stuck on the mount 60, and the release paper 70 which is overlaid and stuck on the adhesive AD and can be released.

The adhesive AD is formed of, for example, a hot-melt resin adhesive of thermoplastic plastic, vinyl acetate resin and the like. The adhesive AD includes the first area AR1 in which the housing of the set housing is stuck, and the second area AR2 which is located inside the first area AR1 and in which several parts of the case 16 are fixed. In the present modified example, the first area AR1 includes a pair of first longwise bars ARL1 alone, and the second area AR2 includes a pair of second longwise bars ARL2 alone which are located inside the first longwise bars ARL1 and extend parallel to the first longwise bars ARL1. In other words, the adhesive AD is formed in a shape in which a pair of sidelong bars and a pair of outer peripheral portions greater in width are not formed.

The mount 60 includes the rectangular first mount BP1 having greater width and length than the adhesive AD, and the second mount BP2 sufficiently smaller than the first mount BP1, similarly to the above-described first embodiment. The first mount BP1 and the second mount BP2 are arranged in a state in which the side edges 52a are in contact with each other. The first area AR1 and the second area AR2 of the adhesive AD are placed on the first mount BP1.

The release paper 70 includes the first paper RP1 and the second paper RP2 which are independent of each other. Similarly to the first embodiment described above, the first paper RP1 is formed in a frame shape, and a pair of longwise bars alone of the first paper RP1 are overlaid and stuck on the first area AR1 of the adhesive AD, i.e., a pair of first longwise bars ARL1. A pair of sidelong bars of the first paper RP1 are opposed to and spaced apart from the mount 60. In addition, one of the inner side edges 80 of the first paper RP1 is located to be aligned with the side edge 52a of the mount 60.

The second paper RP2 is formed in a rectangle having substantially the same shape and dimensions as an inner space of the first paper RP1. The second paper RP2 is disposed to be fit in the inner space of the first paper RP1, and a side top edge of its long side is overlaid and stuck on the second area AR2 of the adhesive AD, i.e., the second longwise bar ARL2 to cover the second area AR2.

The first paper RP1 and the second paper RP2 are formed to be releasable from the adhesive AD independently of each other. As shown in FIG. 22, the second paper RP2 is formed to be thicker than the first paper RP1, and each of the side edges of the second paper RP2 is in contact with the inner side edge of the first paper RP1 to form a difference in level 71, in the present embodiment. In the release, the second paper RP2 alone can easily be released with the difference in level 71 on the boundary between the first paper RP1 and the second paper RP2.

When the liquid crystal display device is manufactured by using the adhesive sheet 50 of the first modified example, the adhesive sheet 50 is disposed above the display panel 12 and the cover panel 14 in a state in which the first mount BP1 and the second paper RP2 are released, as shown in FIG. 24. At this time, the FPC 22 of the display panel 12 is bent upwardly and inserted into an inner space of the first paper RP1. In this state, the inner side edge 80 of the first paper RP1 and the side edge of the second mount BP2 are urged to abut on the FPC 22, the adhesive sheet 50 is moved onto the back surface of the cover panel 14 by using the FPC 22 as a guide, and the adhesive AD, i.e., the pair of first longwise bars ARL1 and a pair of second longwise bars ARL2 are stuck on the inner surface of the cover panel 14. More specifically, a rectangular opening portion having slightly larger inside dimensions than the outer shape of the display panel 12, based on the first paper RP1, is formed by releasing the second paper RP2. Even if the adhesive AD is disposed on the longwise bar side alone of the display panel 12, the adhesive AD can easily be stuck on the cover panel 14 with high accuracy by using side portions of the opening portion as sticking guides for the display panel 12. Thus, the adhesive AD is disposed on the surrounding of the long side of the display panel 12, and the pair of second longwise bars ARL2 are exposed from the long side of the display panel 12.

Next, the backlight unit is disposed in the case 16 and then the case 16 and the backlight unit 20 are disposed on the back surface side of the display panel 12. Furthermore, the top edges of a pair of side walls on the long side of the case 16 are fit in the second areas AR2 of the adhesive AD and fixed on the cover panel 14 by the adhesive AD. When the adhesive sheet 50 of the first modified example is used, a pair of side walls 17c on the short side and the flanges 17s, of the case 16, are stuck on the cover panel 14 by a double-faced tape (not shown) or the like.

The first release sheet RP1 of the adhesive sheet 50 and the second mount BP2 are released from the adhesive AD when the LCD 10 is embedded in the set housing and the like. The first release sheet RP1 is maintained in a state of being stuck on the adhesive AD until this time.

Even when the adhesive sheet 50 of the first modified example configured as described above is used, the adhesive layer for fixing the case and for fixing the set housing can be formed, the number of manufacturing steps can be reduced and the manufacturing costs can be reduced by only sticking the adhesive AD formed in a predetermined shape on the cover panel. In addition, the display device capable of being a further slimmer frame, the adhesive sheet, and the adhesive sheet can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the thickness of the adhesive AD may be substantially the same as the thickness of the polarizer PL2 or may be smaller than a sum of the thickness of the polarizer PL2 and the thickness of the adhesive sheet OCA.

In addition, the number of optical sheets OS of the backlight unit 20 is not limited to two, but may be increased as needed. The shape of the display panel 12, constituent members of the backlight unit 20, and the case 16 is not limited to a rectangular shape in planar view, but may be a polygon, a circle, an ellipsoid, an ellipsoid in combination of these shapes, a track shape or the like in planar view.

All of the constituent elements and manufacturing processes which can be implemented by a person of ordinary skill in the art through arbitrary design changes to the constituent elements and manufacturing processes described above as embodiments of the present invention come within the scope of the present invention as long as they are in keeping with the spirit of the present invention. In addition, other effects which can be obtained by the above embodiments and are self-evident from the description in this specification or can be arbitrarily conceived by a person of ordinary skill in the art are considered to be achievable by the present invention as a matter of course.

What is claimed is:

1. An adhesive sheet used for adhering an object surrounding a display panel to a cover panel, the adhesive sheet comprising:
    an adhesive formed in a frame shape with an inner opening surrounding the display panel without contacting the display panel, comprising a first surface to be adhered to the cover panel, a second surface on an opposite side to the first surface, a first area on the second surface, having a frame shape, and a second area on the second surface, located inside the first area;
    a first paper with a frame shape, which is adhered on the second surface, covers the first area, and is releasable; and
    a second paper which is adhered on the second surface, covers the second area and the inner opening, and is releasable.

2. The adhesive sheet of claim 1, further comprising: a slit formed on a boundary between the first paper and the second paper.

3. The adhesive sheet of claim 1, wherein the second paper is thicker than the first paper.

4. The adhesive sheet of claim 1, further comprising: a mount adhered to the first surface.

5. A method of manufacturing a display device, comprising: providing a liquid crystal display panel, a cover panel and an adhesive sheet, wherein the adhesive sheet includes:
    an adhesive having a first surface to be adhered to the cover panel, a second surface on an opposite side to the first surface, a first area on the second surface, having a frame shape, and a second area on the second surface, located inside the first area;
    a first paper with a frame shape, which is adhered on the second surface, covers the first area, and is releasable; and
    a second paper which is adhered on the second surface, covers the second area and an inner opening, and is releasable;
    attaching the liquid crystal display panel to the cover panel;
    sticking the adhesive on the cover panel, along a surrounding of the liquid crystal display panel, the adhesive including the first area for sticking a housing and the second area for sticking at least a part of a case, located on an inner side closer to the liquid crystal display panel than the first area, wherein the adhesive is formed in the frame shape with the inner opening surrounding the liquid crystal display panel without contacting the liquid crystal display panel;
    arranging the case which accommodates a backlight unit so as to oppose to the liquid crystal display panel, and sticking at least a part of the case on the second area; and
    heating and melting the adhesive to bond at least the part of the case.

6. The method of claim 5, further comprising: covering the case with the housing and sticking the housing on the first area.

* * * * *